United States Patent
Sicot et al.

(10) Patent No.: US 12,152,620 B2
(45) Date of Patent: Nov. 26, 2024

(54) AXIALLY CENTERED FASTENING DEVICE OF THE QUARTER-TURN TYPE

(71) Applicant: A. RAYMOND ET CIE, Grenoble (FR)

(72) Inventors: Mikaël Sicot, Varces Allieres et Risset (FR); David Lamoureux, Grenoble (FR)

(73) Assignee: A. RAYMOND ET CIE, Grenoble (FR)

( * ) Notice: Subject to any disclaimer, the term of this patent is extended or adjusted under 35 U.S.C. 154(b) by 544 days.

(21) Appl. No.: 17/298,895

(22) PCT Filed: Nov. 21, 2019

(86) PCT No.: PCT/FR2019/052773
§ 371 (c)(1),
(2) Date: Jun. 1, 2021

(87) PCT Pub. No.: WO2020/115390
PCT Pub. Date: Jun. 11, 2020

(65) Prior Publication Data
US 2022/0018376 A1   Jan. 20, 2022

(30) Foreign Application Priority Data

Dec. 3, 2018 (FR) ........................... 1872246

(51) Int. Cl.
*F16B 21/02* (2006.01)
(52) U.S. Cl.
CPC .................... *F16B 21/02* (2013.01)
(58) Field of Classification Search
CPC .................. F16B 21/02; F16B 5/10
(Continued)

(56) References Cited

U.S. PATENT DOCUMENTS 3,179,367 A * 4/1965 Rapata ............... F25D 23/067
403/252
4,422,222 A * 12/1983 Notoya ............... F16B 21/082
24/453

(Continued)

FOREIGN PATENT DOCUMENTS

| EP | 2894304 A1 | 6/2007 |
| EP | 2016293 B1 | 3/2010 |
| WO | 2013/165948 A1 | 11/2013 |

OTHER PUBLICATIONS

International Search Report for International Application PCT/FR2019/052773 dated Apr. 14, 2020, 2 pages.

(Continued)

*Primary Examiner* — Flemming Saether
(74) *Attorney, Agent, or Firm* — TraskBritt

(57) ABSTRACT

A quarter-turn fastening device for fastening a part to a support comprising comprises: a head carrying the part and intended to rest on a first face of the support; and a holding foot connected to the head and extending along a main axis, the holding foot configured to penetrate axially into an opening of the support, thereby placing the fastening device in an insertion position. The holding foot comprises at least one flexible retaining tab for resting on a second face of the support when the fastening device is moved angularly from the insertion position to a locking position. The flexible tab carries a lug to fill the space between the holding foot and an edge of the opening and thus refocus the fastening device in the opening when the fastening device is moved angularly from the insertion position to the locking position.

15 Claims, 4 Drawing Sheets

(58) Field of Classification Search
USPC .................................. 411/349, 549, 552, 553
See application file for complete search history.

(56) References Cited

U.S. PATENT DOCUMENTS

| | | | | |
|---|---|---|---|---|
| 5,011,356 | A * | 4/1991 | Fernandez | F16B 21/02 |
| | | | | 411/908 |
| 5,342,126 | A * | 8/1994 | Heston | G01K 13/02 |
| | | | | 374/135 |
| 5,448,804 | A * | 9/1995 | Warren | F16B 5/126 |
| | | | | 24/297 |
| 10,907,675 | B2 * | 2/2021 | Ai | F16B 21/02 |
| 11,261,899 | B2 * | 3/2022 | Zander | F16B 21/02 |
| 2015/0290811 | A1 * | 10/2015 | Everard | G06V 20/52 |
| | | | | 348/92 |
| 2021/0088061 | A1 * | 3/2021 | Jones | F16B 5/0621 |

OTHER PUBLICATIONS

International Written Opinion for International Application PCT/FR2019/052773 dated Apr. 14, 2020, 4 pages.

\* cited by examiner

AXIALLY CENTERED FASTENING DEVICE OF THE QUARTER-TURN TYPE

CROSS-REFERENCE TO RELATED APPLICATIONS

This application is a national phase entry under 35 U.S.C. § 371 of International Patent Application PCT/FR2019/052773, filed Nov. 21, 2019, designating the United States of America and published as International Patent Publication WO 2020/115390 A1 on Jun. 11, 2020, which claims the benefit under Article 8 of the Patent Cooperation Treaty to French Patent Application Serial No. 1872246, filed Dec. 3, 2018.

TECHNICAL FIELD

The present disclosure relates to a fastening device intended to secure a part to a support. The part can be a stop, for example, for an opening part of a motor vehicle such as a hood, a trunk door, a tailgate.

BACKGROUND

Documents WO2013165948, FR2894304, EP2016293 are known to be quarter-turn fasteners designed to secure a part to a support. These devices consist of a head and a holding foot with retaining elements to hold the fastening device securely to the support. The holding foot and the retaining elements are inserted through an opening in the support until the head rests on a first face of the support. The locking of the fastening device is ensured by rotating it, for example, by a quarter turn. In this locking position, the retaining elements rest against the other face of the support and then hold the fastening device in place.

However, depending on the exact dimensions of the parts, there may be a clearance between the holding foot and the edge of the opening. The existence of this clearance may lead to the position of the fastening device being moved in the plane of the support, which may be annoying. Indeed, this can lead to the incorrect assembly of the part to the support by causing an offset of its position as well as a poor holding of the assembly.

A purpose of the present disclosure is thus to propose a fastening device, remedying all or part of the disadvantages of the prior art. In particular, it aims to provide a fastening device that can be positioned in a support opening of a variety of dimensions while preventing the device from moving in the plane of the support, regardless of the exact size of the opening among the variety of possible dimensions.

BRIEF SUMMARY

In order to achieve this goal, the object of the present disclosure proposes a device, of the quarter-turn type, for fastening a part to a support, the fastening device comprising: a head carrying the part, the head being intended to rest on a first face of the support; a holding foot connected to the head and extending along a main axis, the holding foot being configured to penetrate axially into an opening of the support, the opening having a peripheral edge, thereby placing the fastening device in an insertion position having a first angular orientation, the holding foot comprising at least one flexible retaining tab for resting on a second face of the support when the fastening device is moved angularly from the insertion position to a locking position having a second angular orientation.

According to the present disclosure, the flexible tab carries a lug to fill the space that may exist between the holding foot and the edge of the opening and thus refocus the fastening device in the opening when it is moved angularly from the insertion position to the locking position.

According to other advantageous and unrestrictive characteristics of the present disclosure, taken alone or in any technically feasible combination:
   the head comprises at least one locking element, intended to occupy the opening of the support when the fastening device is in the locking position;
   the locking element is arranged at an angle of 90° relative to the flexible tab;
   the locking element consists of a pair of parallel ribs connected to the holding foot;
   the base of the flexible retaining tab is fastened to a plate projecting from the external surface of the holding foot and arranged in a plane perpendicular to the main axis;
   the end of the flexible tab is free and can be deformed in a direction perpendicular to the support;
   the flexible tab has an initial inclination that is not orthogonal to the plate;
   the holding foot is equipped with at least one guide rib;
   the lug has a base connecting it to the flexible tab and a vertex, the dimension of the vertex being smaller than the dimension of the base.

BRIEF DESCRIPTION OF THE DRAWINGS

Further characteristics and advantages of the present disclosure will appear from the following detailed description of the present disclosure, made in reference to the accompanying figures, among which.

DETAILED DESCRIPTION

For the sake of simplifying the following description, the same references will be used for elements that are identical or perform the same function. The figures are schematic representations, which, for the sake of clarity, are not to scale.

Description of the Fastening Device

Figure 1:
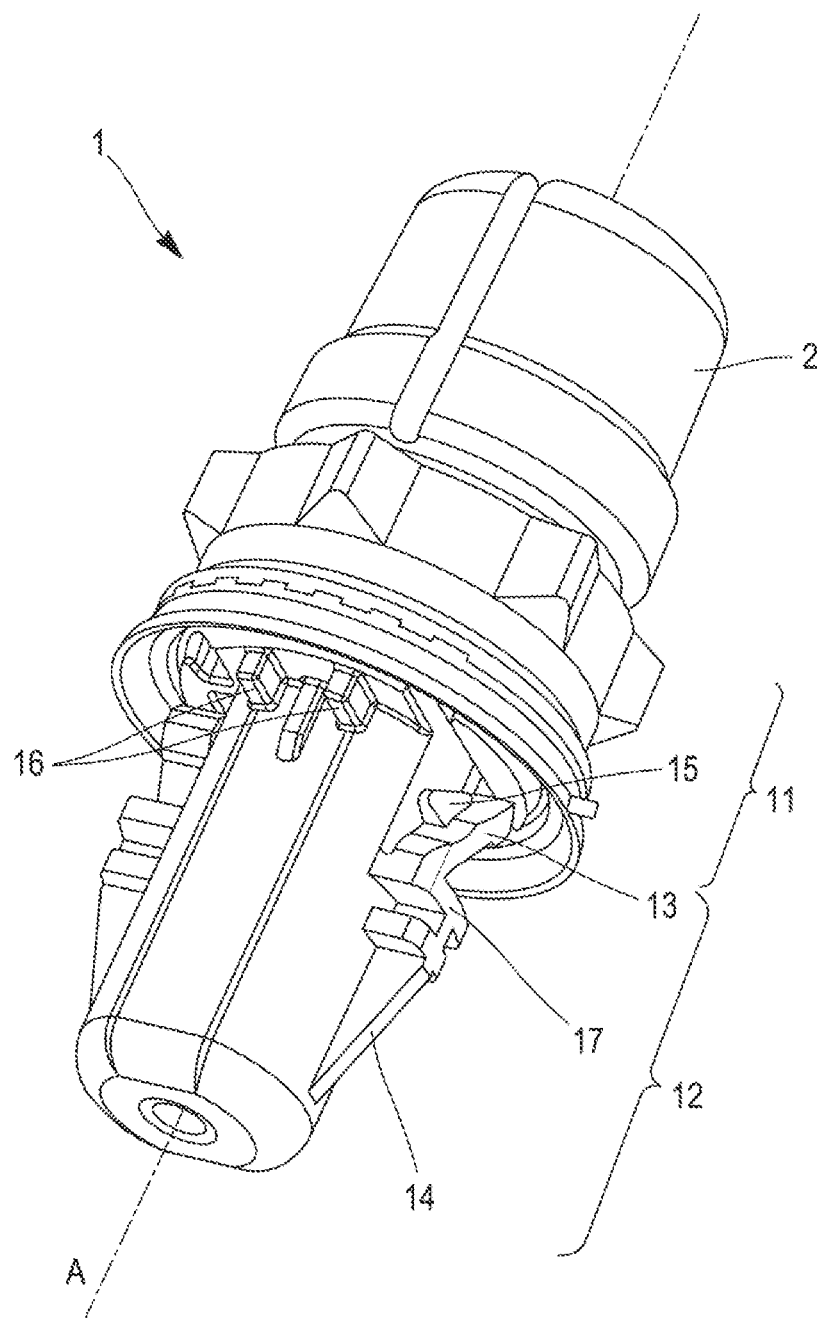
FIG. 1 shows a global view of a device for fastening a part to a support according to the present disclosure.

FIG. 1 shows a global view of a fastening device 1 according to the present disclosure. This fastening device 1 consists of a head 11 and a holding foot 12, connected to the head 11.

The head 11 carries the part 2, which is to be fastened to the support 3, which can be of various types, in this case a stop. The head is also intended to be supported on a first side of the support 3. Advantageously, and as in the example shown in the figures, it can be equipped with a sealing ring, intended to rest on the support, if necessary or useful for the application considered.

The generally cylindrical holding foot 12 extends along a main axis A and here carries two flexible retaining tabs 13, diametrically opposed to each other. The base of the flexible retaining tab 13 is fastened to a plate 17 projecting from the outer surface of the holding foot 12 and arranged in a plane perpendicular to the main axis A. The end of the flexible tab 13 is free and can deform in a direction perpendicular to the support 3 to rest a second face of the support when the fastening device 1 is locked by rotation. Thus, the flexible tab 13 allows the fastening device 1 to be locked to the support 3 by performing an axial rotation, for example, a quarter-turn rotation, after the holding foot 12 has been inserted into the opening 31. It is specified that the term "quarter-turn type" in this application refers to any rotation of the fastening device 1 by 90°, plus or minus 20° relative to the support. Advantageously, the flexible tabs 13 have an initial inclination non-orthogonal to the plate 17, in reverse directions from one tab to another, to promote their deformations in a preferred direction of rotation of the fastening device 1.

The present disclosure is by no means limited to a holding foot carrying precisely two flexible tabs, and consideration could be given to forming a fastening device with a different number of such tabs.

The flexible tabs 13 each have a lug 15 to fill the space that may exist between the holding foot 12 and the edge of the opening 31 and thus refocus the fastening device 1 in the opening 31 when it is moved angularly from the insertion position to the locking position, as disclosed in greater details later in this description.

The holding foot 12 shown in the figures also has two guide ribs 14. These guide ribs 14 are oriented along the main axis A, and extend from the end of the holding foot 12 to the plate 17, respectively. The guide ribs 14 guide the insertion of the holding foot 12 into the opening of the support to place the fastening device 1 in its insertion position, according to a first angular orientation toward this support. In this first angular position, the projecting parts carried by the holding foot 12 (the guide ribs 14, plate 17, flexible tabs 13) are aligned with slots in the opening, thus allowing them to pass under the first face of the support.

In the example shown, the head 11 is equipped on the face intended to rest on the support with two locking elements 16 diametrically opposed to each other and arranged here at 90° with respect to the flexible tabs 13. The locking elements 16 are protruding from the head 11 and are also connected to the holding foot 12 in the form of a pair of parallel ribs, as shown in FIG. 1. The locking elements 16 are in contact with the first face of the support when the fastening device is in the insertion position on the support, and are housed in the slots when the fastening device 1 is in the locking position, so as to block the main axis rotation of the fastening device 1 after its locking.

The fastening device 1 is advantageously formed by injection of a plastic material. The support 3 can be of a varied nature, for example, it can be a plastic material or a metallic material such as a sheet metal plate.

Description of the Fastening Device

Figure 2A:
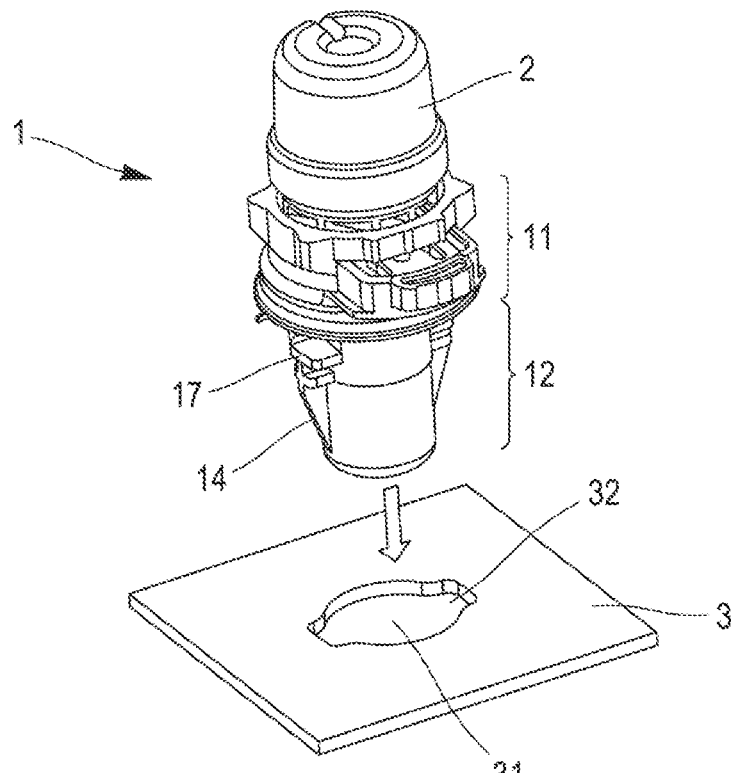
FIG. 2A shows the step of inserting the fastening device.
Figure 2B:
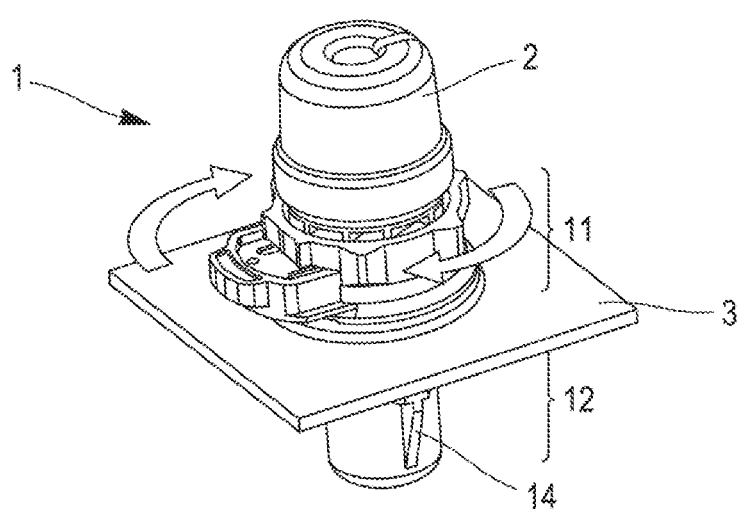
FIG. 2B represents the step of locking the fastening device.

FIGS. 2A and 2B show the general operation of the fastening device.

FIG. 2A shows the step of inserting the fastening device 1 into the intended opening 31 of the support 3. During this step, the holding foot 12 penetrates into the opening 31 to contact the head 11 with the first surface of the support 3. As already mentioned, the opening 31 has slots 32 configured to allow the passage of flexible tabs 13, and guide ribs 14 if they are present. These slots 32 are also intended to accommodate the locking elements 16 when the fastening device is in the locking position. At the end of the step shown in FIG. 2A, the fastening device 1 is in the insertion position and has a first angular orientation. The locking elements, if provided, rest on the first side of the support.

In a second step, represented by FIG. 2B, a rotation of a quarter turn, or any other angle value depending on the chosen configuration, is applied to the fastening device to place it in the locking position in which it has a second angular orientation. During rotation, the flexible tabs 13 contact the peripheral edge of the slots 32, deform and pass under the support 3. In the locked position, the flexible tabs 13 rest against the second side of the support 3, thus retaining the fastening device 1 assembled to the support 3. In this position, the locking elements 16 are housed in the slots 32 and block any excessive rotation of the fastening device 1 relative to the support 3, which would tend to return this device to the insertion position.

To disassemble the fastening device 1, simply perform the above-mentioned steps in the reverse order. The first step is therefore to apply a tensile force to the fastening device to dislodge the locking elements 16 from the notches and then to rotate the device to realign the flexible tabs 13 with the slots 32, according to the first angular orientation of the insertion position.

How Refocusing Works

Figure 3A:
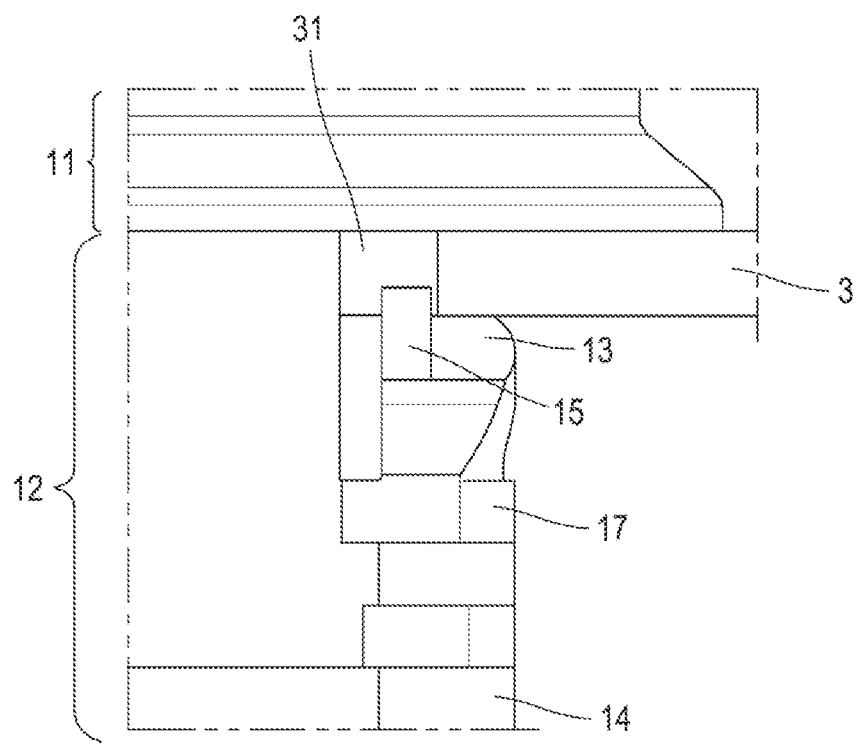
FIG. 3A shows a longitudinal section of the fastening device in transition from the delivery position to the locking position for an opening with a diameter larger than the holding foot.
Figure 3B:
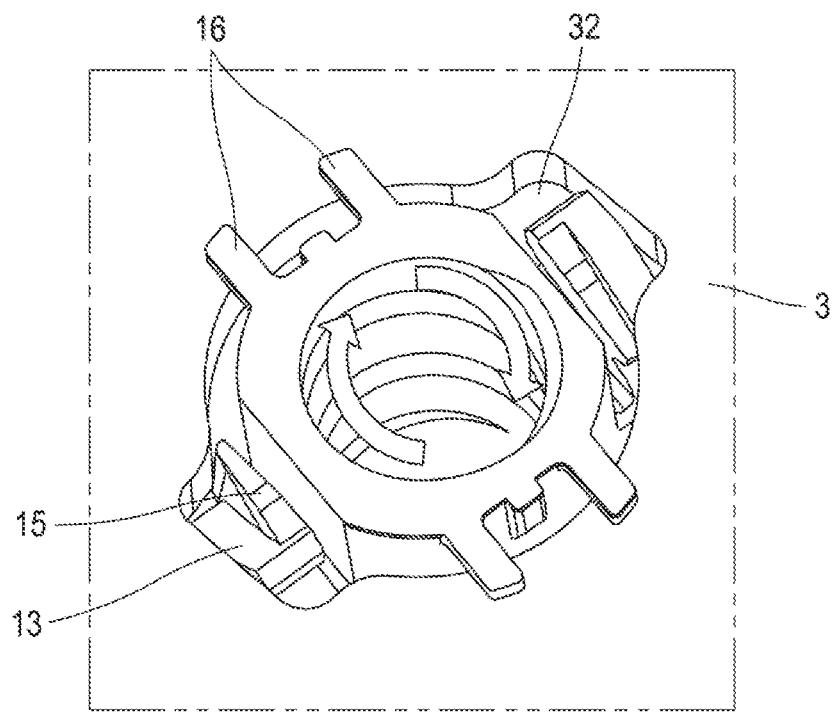
FIG. 3B shows a cross-section of the fastening device in transition from the delivery position to the locking position at the locking elements for an opening with a diameter larger than the holding foot.

FIGS. 3A and 3B show an example of an implementation in which the opening 31 has a larger dimension than the foot 12, thus creating a free space between the peripheral edge of the opening 31 and the foot 12. The fastening device 1 is therefore likely to move in the plane of the support 3, after the locking thereof, which is problematic. To overcome this problem, as briefly mentioned above, the present disclosure provides for the flexible tab 13 to be fitted with a lug 15.

The lug 15 is formed on the face of the flexible tab 13 that may be in contact with the second face of the support 3. The lug 15 occupies a portion of the surface of the flexible tab 13, located on the holding foot 12 side, and extends toward the head 11 of the fastening device 1. The purpose of this lug 15 is to fill the gap between the holding foot 12 and the peripheral edge of the opening 31, as shown in FIGS. 3A and 3B. It has the effect of refocusing the fastening device 1 in the opening 31 during the locking rotation, and thus blocking any excessive movement of the fastening device 1 in the plane of the support 3 in the locking position.

Optionally, the lug 15 can be profiled so that its dimensions at its top are smaller than at its base. This profile has the advantage of allowing the insertion of at least the top of the lug 15 for a narrow space between the peripheral edge of the opening and the foot of the device, and, more generally, allowing the refocusing effects for a wide amplitude of this space.

Figure 4A:
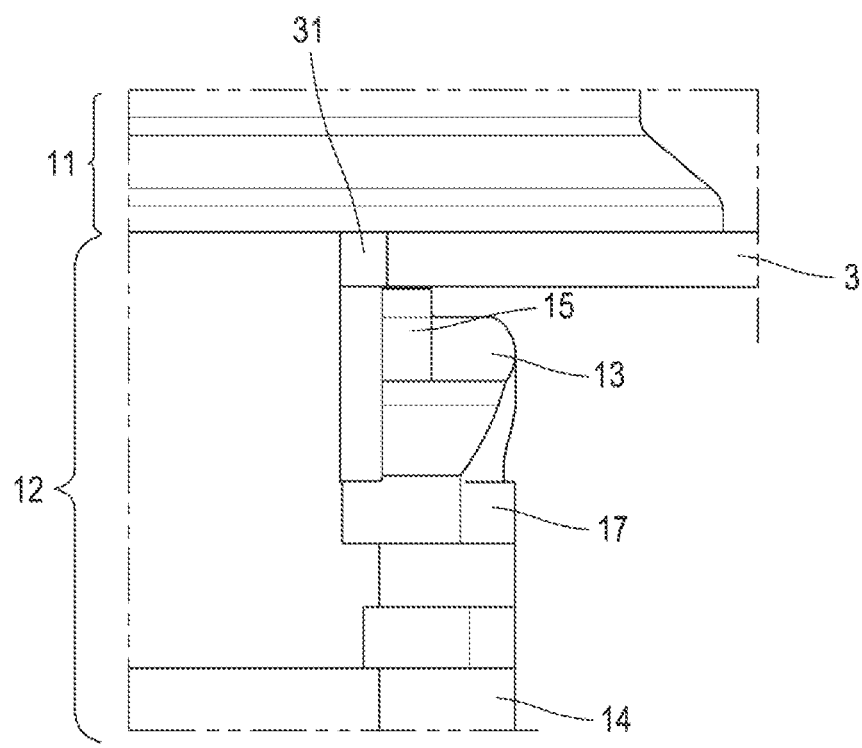
FIG. 4A shows a longitudinal section of the fastening device in transition from the delivery position to the locking position for an opening with a diameter adapted to the holding foot.
Figure 4B:
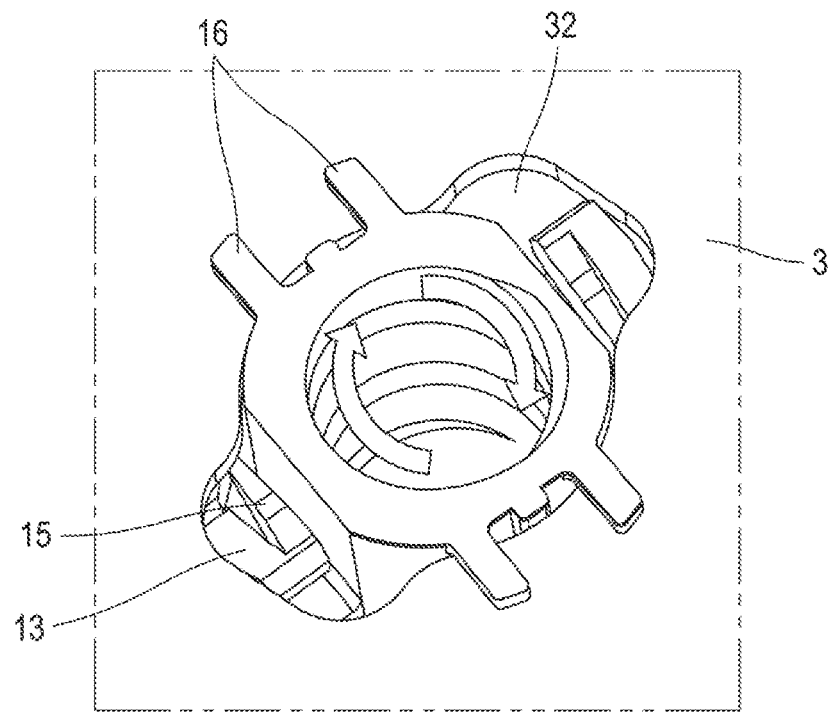
FIG. 4B shows a cross-section of the fastening device in transition from the delivery position to the locking position at the locking elements for an opening with a diameter adapted to the holding foot.

If the opening 31 has a dimension perfectly adjusted to the holding foot 12, and as shown in FIGS. 4A and 4B, there is not enough clearance between the foot and the peripheral edge of the opening 31 to allow the lug 15 to fit into it during the locking rotation. In this case, the lug 15 behaves in a similar way to the flexible tabs 13 and therefore slides under the support 3 to stop against its surface when the fastening device 1 is in the locking position.

The present disclosure thus has the advantage of providing a fastening device that can be positioned in a support opening of a variety of dimensions while preventing the device from moving in the plane of the support, regardless of the exact size of the opening among the variety of possible dimensions.

Of course, the present disclosure is not limited to the described embodiments and alternative solutions can be used without departing from the scope of the invention, as defined in the claims.

The invention claimed is:

1. A fastening device for fastening a part to a support, the fastening device comprising:
   a head carrying the part, the head configured to rest on a first face of the support; and
   a holding foot connected to the head and extending along a main axis, the holding foot configured to penetrate axially into an opening of the support, the opening having a peripheral edge, thereby placing the fastening device in an insertion position having a first angular orientation, the holding foot comprising at least one flexible retaining tab for resting on a second face of the support when the fastening device is moved angularly from the insertion position to a locking position having a second angular orientation, the flexible retaining tab carrying a lug, wherein the flexible retaining tab is flexible in a direction lateral to the axis such that the lug is configured to fill space between the holding foot and the peripheral edge of the opening and thereby refocus the fastening device in the opening when the fastening device is moved angularly from the insertion position to the locking position.

2. The fastening device of claim 1, wherein the head comprises at least one locking element configured to occupy the opening of the support when the fastening device is in the locking position.

3. The fastening device of claim 2, wherein the locking element is arranged at an angle of 90° relative to the flexible retaining tab.

4. The fastening device of claim 3, wherein the locking element comprises a pair of parallel ribs connected to the holding foot.

5. The fastening device of claim 4, wherein a base of the flexible retaining tab is fastened to a plate projecting from the external surface of the holding foot and arranged in a plane perpendicular to the main axis.

6. The fastening device of claim 5, wherein an end of the flexible retaining tab is free and configured to deform in a direction perpendicular to the support.

7. The fastening device of claim 6, wherein the flexible retaining tab has an initial inclination that is not orthogonal to the plate.

8. The fastening device of claim 7, wherein the holding foot comprises at least one guide rib.

9. The fastening device of claim 8, wherein the lug has a base connecting the lug to the flexible retaining tab and a vertex, a dimension of the vertex being smaller than a dimension of the base.

10. The fastening device of claim 2, wherein the locking element comprises a pair of parallel ribs connected to the holding foot.

11. The fastening device of claim 1, wherein the base of the flexible retaining tab is fastened to a plate projecting from an external surface of the holding foot and arranged in a plane perpendicular to the main axis.

12. The fastening device of claim 11, wherein the flexible retaining tab has an initial inclination that is not orthogonal to the plate.

13. The fastening device of claim 1, wherein an end of the flexible retaining tab is free and configured to deform in a direction perpendicular to the support.

14. The fastening device of claim 1, wherein the holding foot comprises at least one guide rib.

15. The fastening device of claim 1, wherein the lug has a base connecting the lug to the flexible retaining tab and a vertex, a dimension of the vertex being smaller than a dimension of the base.

* * * * *

UNITED STATES PATENT AND TRADEMARK OFFICE
CERTIFICATE OF CORRECTION

PATENT NO. : 12,152,620 B2
APPLICATION NO. : 17/298895
DATED : November 26, 2024
INVENTOR(S) : Mikaël Sicot and David Lamoureux It is certified that error appears in the above-identified patent and that said Letters Patent is hereby corrected as shown below:

On the Title Page
In ITEM (57) ABSTRACT     Lines 3-4,     change "to a support comprising comprises: a head" to --to a support comprises: a head--

In the Claims
Claim 5,     Column 6,     Lines 8-9,     change "projecting from the external surface" to --projecting from an external surface--

Signed and Sealed this
First Day of April, 2025

Coke Morgan Stewart
*Acting Director of the United States Patent and Trademark Office*